United States Patent [19]

Pitzer et al.

[11] Patent Number: 5,368,640

[45] Date of Patent: Nov. 29, 1994

[54] TRANSPARENT IRON OXIDE PIGMENTS, PROCESSES FOR THEIR PRODUCTION AND THEIR USE

[75] Inventors: Ulrike Pitzer; Klaus Lerch; Gunter Buxbaum, all of Krefeld, Germany

[73] Assignee: Bayer AG, Leverkusen

[21] Appl. No.: 134,586

[22] Filed: Oct. 12, 1993

[30] Foreign Application Priority Data

Oct. 23, 1992 [DE] Germany ............................ 4235945

[51] Int. Cl.$^5$ ............................................. C01G 49/02
[52] U.S. Cl. ..................................... 106/456; 423/633
[58] Field of Search ........................ 106/456; 423/633

[56] References Cited

U.S. PATENT DOCUMENTS

| | | | |
|---|---|---|---|
| 2,558,303 | 6/1951 | Marcot et al. | 106/460 |
| 2,558,304 | 6/1951 | Marcot et al. | 106/460 |
| 3,198,603 | 8/1965 | MacCallom et al. | 423/633 |
| 3,946,103 | 3/1976 | Hund | 423/633 |
| 4,459,276 | 7/1984 | Nobuoka et al. | 106/456 X |
| 4,643,772 | 2/1987 | Gaedcke et al. | 106/304 |

OTHER PUBLICATIONS

Clays and Clay Minerals, May 1985, vol. 33, No. 5, Effect of Solution Conditions on the Proportion and Morphology of Goethite Formed from Ferrihydrite, pp. 424–432.

Pigment Handbook, 1988, vol. 1, Second Edition, Properties and Economics, pp. 297–302.

*Primary Examiner*—Karl Group
*Assistant Examiner*—Chris Gallo
*Attorney, Agent, or Firm*—Connolly & Hutz

[57] ABSTRACT

The invention relates to transparent iron oxide pigments having an average particle size, based on the longest needle axis, of less than 0.1 μm, to processes for their production and to their use for pigmenting lacquers and plastics.

16 Claims, 2 Drawing Sheets

TRANSPARENT IRON OXIDE PIGMENTS, PROCESSES FOR THEIR PRODUCTION AND THEIR USE

This invention relates to transparent iron oxide pigments having an average particle size, based on the longest needle axis, of less than 0.1 μm, to processes for their production and to their use for pigmenting lacquers and plastics.

Iron oxide pigments having an average particle size of less than 0.1 μm are known as transparent iron oxide pigments because they transmit visible light. In the case of acicular particles, the particle size is expressed as the length of the needles. Alternatively to the particle size, the specific surface is also often used as a measure of the size of the particles. In this case, particles having specific BET surfaces of more than approx. 80 m$^2$/g are generally regarded as transparent. Transparent iron oxide pigments are used above all in the production of automotive effect lacquers, clear wood varnishes and for pigmenting transparent plastics.

Yellow iron oxide hydroxides can be synthesized by various methods as described, for example, in T. C. Patton, Pigment Handbook, Vol. 1, New York 1988, pages 297 et seq. The processes in question are generally based on the alkaline precipitation of iron(II) compounds from iron(II) salt solutions and subsequent oxidation of the iron (II) salt compounds to form an iron-(III) oxide pigment.

The precipitation step may be carried out both in acidic and in alkaline medium. In order to steer the precipitated salts towards the extreme particle fineness required for transparency, the precipitation step is preferably carried out with alkali metal carbonates as precipitant and generally in the presence of modifiers (U.S. Pat. No. 2,558,303).

Since the transparent iron oxide pigments have a pronounced tendency to agglomerate on account of their high specific surface, special processes were developed with a view to obtaining less highly agglomerated and better dispersible powders. These processes include, for example, the pyrolytic decomposition of carbonyl compounds and the precipitation of the pigments in organic solvents. However, these processes are complicated and expensive.

Where the precipitation step is carded out in aqueous medium, experience has shown that precipitation in an alkaline medium leads to less highly agglomerated powders than precipitation in acidic medium. In the processes for the production of transparent iron oxide pigments described in U.S. Pat. No. 2,558,303 and in U.S. Pat. No. 2,558,304, an aqueous iron(II) salt solution is added to at least 100% of a stoichiometrically equivalent quantity of an aqueous alkali metal carbonate or alkali metal hydroxide solution at temperatures below 40° C. and the resulting suspension is then completely oxidized over a period of 15 minutes to 10 hours at temperatures below 40° C. to form an iron(III) oxide hydroxide suspension, the oxidation step being carded out in the presence of seed modifiers, for example SiO$_2$, zinc salts or hydroxycarboxylic acids, to control particle fineness. To improve its dispersibility, the pigment is also treated with a lyophilic organic substance, for example with fatty acids.

However, these processes are attended on the one hand by the disadvantage that modifiers are used to control particle size and on the other hand by the disadvantage that the precipitation steps lead to high concentrations of alkalines in the wastewaters.

Accordingly, the problem addressed by the present invention was to provide a process for the production of readily dispersible transparent yellow iron oxide pigments which would not have any of the described disadvantages of conventional processes.

According to U.S. Pat. No. 2,558,303, red transparent iron oxide pigments can be produced by calcination from yellow transparent iron oxide pigments. The calcination process is carried out at relatively low temperatures to avoid severe agglomeration of the acicular particles. However, despite calcination temperatures of typically below 400° C., hard aggregates are generally formed and have to be intensively ground up. Accordingly, there was still a need for transparent iron oxides which would not be so severely agglomerated and for processes for their production.

It has now surprisingly been found that, in contrast to the prior art, readily dispersible, transparent yellow iron oxide pigments can be produced by a precipitation process carried out in the acidic pH range in the absence of modifiers. These pigments differ from the hitherto known acicular or isometric transparent iron oxide pigments in the fact that their particles have a stellar habit. One example is shown in FIG. 1. As can be seen in FIG. 1, the particles are composed of clusters of iron oxide needles so that the particles have predominantly stellar habit.

Accordingly, the present invention relates to transparent iron oxide pigments having an average particle size, based on the longest needle axis, of less than 0.1 μm, most of the particles having a stellar habit.

The transparent iron oxide pigments according to the invention may be present both as yellow iron(III) oxide hydroxide of the α-FeOOH modification and as red iron(III) oxide of the α-Fe$_2$O$_3$ modification.

The present invention also relates to a process for the production of yellow transparent iron oxide pigments having a stellar habit by precipitation of iron(II) salts with an alkali solution and subsequent oxidation with oxygen-containing gases, in which a) an aqueous iron(II) sulfate solution having a concentration of 10 to 80 g/l and preferably 20 to 40 g/l is initially introduced, b) precipitated with 0.8 to 1.0 equivalent and preferably with 0.85 to 0.95 equivalent of an alkaline precipitant and c) for oxidation, is intensively aerated with air in a quantity of 20 to 300 l per hour and per liter suspension.

The stellar habit of the pigments according to the invention prevents the acicular primary particles from clustering together to form hard agglomerates so that dispersibility is improved. Although α-FeOOH particles having a stellar habit are known in principle (Cornell, Giovanoli, Clays and Clay Minerals 33, (1985), 424), the known particles do not have the particle size of less than 0.1 μm required for transparency.

Iron sulfate from steel pickling plates and/or from the production of titanium dioxide is preferably used as the iron(II) salt. The relatively low concentration of the iron(II) sulfate solution is a key feature of the process according to the invention. The temperature prevailing during the precipitation step is preferably in the range from 15° to 50° C. and more preferably in the range from 20° to 45° C. A suspension of iron(II) hydroxide or carbonate is precipitated by addition of 0.8 to 1.0 equivalent and preferably 0.85 to 0.95 equivalent of an alkaline precipitant, preferably NaOH, $Na_2CO_3$, $NH_3$, MgO and/or $MgCO_3$. Precipitation is followed by oxidation, preferably using air as the oxidant. Intensive aeration is necessary and is guaranteed by the introduction of 20 to 300 l air per hour and per liter suspension.

The suspension thus obtained may then advantageously be subjected ripening for 1 to 4 hours at 70° to 100° C. The pigment is then filtered off, washed and dried. The pigment obtained consists of goethite ($\alpha$-FeOOH). The particles have a predominantly stellar habit, the individual needles of the star having a needle length of less than 0.1 μm. Lacquer coatings of the pigment on a chess board pattern show high transparency and are lemon-yellow in color.

The pigment may also be used for pigmenting transparent plastics. The present invention also relates to the use of the yellow pigments according to the invention for pigmenting lacquers and plastics.

The transparent red iron oxide pigments with their stellar habit may be obtained by calcining yellow transparent pigments according to the invention in air over periods of a five minutes up to 4 h and preferably over periods of 30 mins. to 2 h at temperatures in the range from 150° to 500° C. and preferably at temperatures in the range from 200° to 400° C. The yellow goethite decomposes to red hematite ($\alpha$-$Fe_2O_3$), the stellar habit and the particle size and hence the transparency remaining intact. The pigments are then lightly ground. Transparent, red stellar iron oxide pigments have not hitherto been known.

Lacquer coatings of the pigments dispersed in lacquer on a chess board pattern show high transparency and have a red color tone.

The pigments may be used not only in lacquers, but also for pigmenting transparent plastics.

The present invention also relates to the use of the pigments according to the invention for pigmenting lacquers, particularly automotive effect lacquers and wood varnishes, and plastics.

The red iron pigments according to the invention may also be converted into brown, stellar transparent iron oxide pigments of the $\gamma$-$Fe_2O_3$ modification by initially reducing them to $Fe_3O_4$ followed by re-oxidation to $\gamma$-$Fe_2O_3$ as known, for example, from the production of $\gamma$-$Fe_2O_3$ pigments for magnetic materials.

The specific BET surface of the powders according to the invention is determined by the nitrogen 1-point adsorption method according to DIN 66 131.

The following Examples describe the production of the yellow and red stellar transparent iron oxide pigments. The Examples are intended to illustrate the process according to the invention without limiting it in any way.

EXAMPLE 1

22.3 l of an iron sulfate solution having a concentration of 25 g/l $FeSO_4$ are initially introduced. The temperature is 40° C. 1.3 l of a 4.75 N NaOH solution are added and the suspension is subsequently oxidized for 20 minutes with 52 l air per hour and per liter suspension. The yellow suspension thus obtained is heated to 80° C. and stirred for 2 h, subsequently filtered, washed free from salts and dried at 85° C. The pigment obtained is ground.

Figure 1:
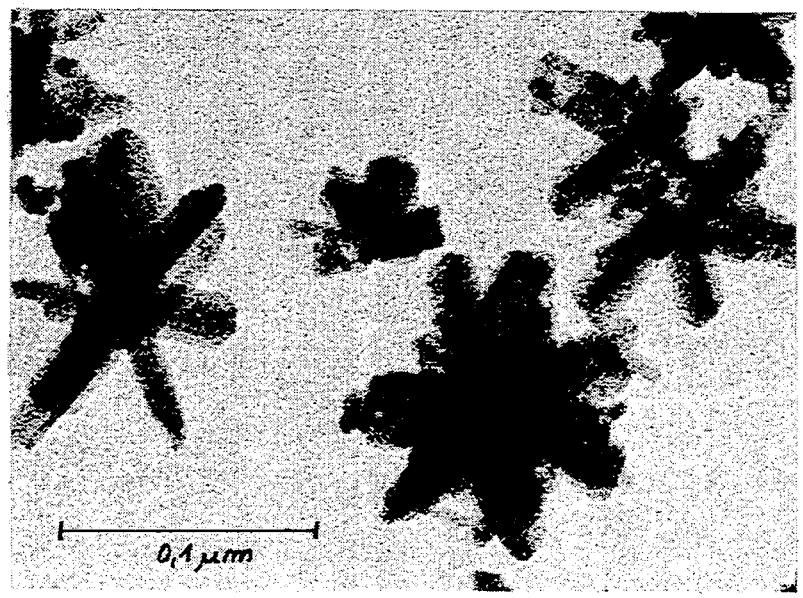
FIG. 1 is a photomicrograph of the particles produced in Example 1.

The particles have a predominantly stellar habit with an average needle length of approx. 0.06 μm, as shown in FIG. 1. The specific BET surface is 135 $m^2/g$. An X-ray diffractogram shows only the reflexes of $\alpha$-FeOOH. The pigment is dispersed in Alkydal F 48 (a medium-oil alkyd resin based on drying vegetable fatty acids produced by Bayer AG) in a concentration of 5%. The lacquer coating shows high transparency and is yellow in color.

EXAMPLE 2

The pigment obtained in accordance with Example 1 is calcined in air for 30 minutes at 300° C. and then ground.

Figure 2:
FIG. 2 is a photomicrograph of the particles produced in Example 2.

The pigment particles have a predominantly stellar habit with an average needle length of approx. 0.06 μm, as shown in FIG. 2. The specific surface is 168 $m^2/g$. The iron oxide is present in the $\alpha$-$Fe_2O_3$ modification.

The pigment is dispersed in Alkydal F 48 in the same way as described in Example 1. The lacquer coating shows high transparency and is red in color.

What is claimed is:

1. Transparent iron oxide pigments consisting essentially of particles composed of clusters of iron oxide needles, said particles having a predominantly stellar habit, wherein said particles have an average particle size, based on the longest needle axis, of less than 0.1 μm.

2. A transparent iron oxide pigment as claimed in claim 1, wherein the iron oxide needles consist of yellow iron(III) oxide hydroxide of the $\alpha$-FeOOH modification.

3. A transparent iron oxide pigment as claimed in claim 1, wherein the iron oxide needles consist of red iron(III) oxide of the $\alpha$-$Fe_2O_3$ modification.

4. A process for the production of transparent iron oxide pigments consisting essentially of particles composed of clusters of yellow iron(III) oxide hydroxide needles, said particles having a predominantly stellar habit, wherein said particles have an average particle size, based on the longest needle axis, of less than 0.1 μm, said process comprising
   a) forming an aqueous iron(II) sulfate solution having a concentration of from about 10 to 80 g/l;
   b) adding about 0.8 to 1.0 equivalent of an alkaline precipitant to said aqueous iron(II) sulfate solution to precipitate a suspension of iron(II) hydroxide or iron(II) carbonate;
   c) oxidizing said iron(II) hydroxide or iron(II) carbonate by intensively aerating said suspension with an oxygen-containing gas to form a suspension, of iron(III) oxide hydroxide of the $\alpha$-FeOOH modification; and
   d) recovering said yellow iron(III) oxide hydroxide.

5. A process as claimed in claim 4, wherein the precipitation is carried out at a temperature of from about 15° to 50° C.

6. A process as claimed in claim 4, wherein the precipitant comprises at least one substance selected from the group consisting of NaOH, $Na_2CO_3$, $NH_3$, MgO and $MgCO_3$.

7. A process as claimed in claim 4, wherein the suspension of iron(III) oxide hydroxide is ripened for 1 to 4 hours at a temperature of from about 70° to 100° C.

8. A process for the production of transparent iron oxide pigments consisting essentially of particles composed of clusters of red iron(III) oxide needles, said particles having a predominantly stellar habit, wherein said particles have an average particle size, based on the longest needle axis, of less than 0.1 μm, said process comprising
   a) forming an aqueous iron(II) sulfate solution having a concentration of from about 10 to 80 g/l;
   b) adding about 0.8 to 1.0 equivalent of an alkaline precipitant to said aqueous iron(II) sulfate solution to precipitate a suspension of iron(II) hydroxide or iron(II) carbonate;
   c) oxidizing said iron(II) hydroxide or iron(II) carbonate by intensively aerating said suspension with an oxygen-containing gas to form a suspension of iron(III) oxide hydroxide of the α-FeOOH modification;
   d) recovering said yellow iron(III) oxide hydroxide;
   e) calcining said yellow iron(III) oxide hydroxide at a temperature of from about 150°–500° C. for a period of time of from about 5 minutes to 4 hours to form red iron(III) oxide of the α-$Fe_2O_3$ modification; and
   f) recovering said red iron(III) oxide.

9. A process as claimed in claim 8, wherein the calcination time is from about 30 minutes to 2 hours.

10. A process as claimed in claim 8, wherein the calcination is carried out in air.

11. A process as claimed in claim 4, wherein the concentration of the aqueous iron(II) sulfate solution is from about 20 to 40 g/l.

12. A process as claimed in claim 4, wherein about 0.85 to 0.95 equivalent of said alkaline precipitant is added to said aqueous iron(II) sulfate solution in step b).

13. A process as claimed in claim 4, wherein said oxygen-containing gas is air.

14. A process as claimed in claim 13, wherein said air is introduced to said suspension of iron(II) hydroxide or iron(II) carbonate in a quantity of from about 20 to 300 liters of air per hour and per liter of said suspension.

15. A process as claimed in claim 5, wherein said precipitation is carried out at a temperature of from about 20° to 45° C.

16. A process as claimed in claim 8, wherein said calcining is carried out at a temperature of from about 200° to 400° C.

* * * * *